(12) United States Patent
Trice et al.

(10) Patent No.: US 10,550,303 B2
(45) Date of Patent: Feb. 4, 2020

(54) HIGH EMISSIVITY MATERIALS AND METHODS OF MANUFACTURE

(71) Applicant: Purdue Research Foundation, West Lafayette, IN (US)

(72) Inventors: Rodney Trice, West Lafayette, IN (US); Winnie Tan, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 28 days.

(21) Appl. No.: 15/632,506

(22) Filed: Jun. 26, 2017

(65) Prior Publication Data
US 2018/0127630 A1 May 10, 2018

Related U.S. Application Data

(63) Continuation-in-part of application No. 13/625,279, filed on Sep. 24, 2012, now abandoned.

(51) Int. Cl.
| | |
|---|---|
| *C04B 35/58* | (2006.01) |
| *C04B 35/565* | (2006.01) |
| *C09K 5/14* | (2006.01) |
| *C04B 35/622* | (2006.01) |
| *B64C 30/00* | (2006.01) |
| *F28F 19/02* | (2006.01) |

(52) U.S. Cl.
CPC ............ *C09K 5/14* (2013.01); *B64C 30/00* (2013.01); *C04B 35/58078* (2013.01); *C04B 35/62222* (2013.01); *C04B 2235/3224* (2013.01); *C04B 2235/3813* (2013.01); *C04B 2235/3826* (2013.01); *C04B 2235/443* (2013.01); *C04B 2235/9607* (2013.01); *F28F 19/02* (2013.01)

(58) Field of Classification Search
CPC . C04B 35/5878; C04B 35/565; C04B 35/571; C04B 35/573; C04B 35/575; C04B 35/5755; C04B 35/58078
See application file for complete search history.

(56) References Cited

U.S. PATENT DOCUMENTS

| | | |
|---|---|---|
| 5,354,446 A | 10/1994 | Kida |
| 2002/0031658 A1 | 3/2002 | Chow |
| 2004/0229031 A1 | 11/2004 | Gell |
| 2015/0132569 A1* | 5/2015 | Trice ............. C04B 41/87 428/332 |

* cited by examiner

*Primary Examiner* — Karl E Group
(74) *Attorney, Agent, or Firm* — C. John Brannon; Brannon Sowers & Cracraft PC

(57) ABSTRACT

A hypersonic refractory material, including a refractory leading edge portion for a hypersonic vehicle and a high emissivity oxide coating adhered to the refractory leading edge portion. The high emissivity oxide coating is $ZrB_2$ doped with a cation dopant material selected from the group including Sm, Tm, and mixtures thereof. The cation dopant material is present in a concentration of between 3 mole percent and 8 mole percent.

7 Claims, 7 Drawing Sheets

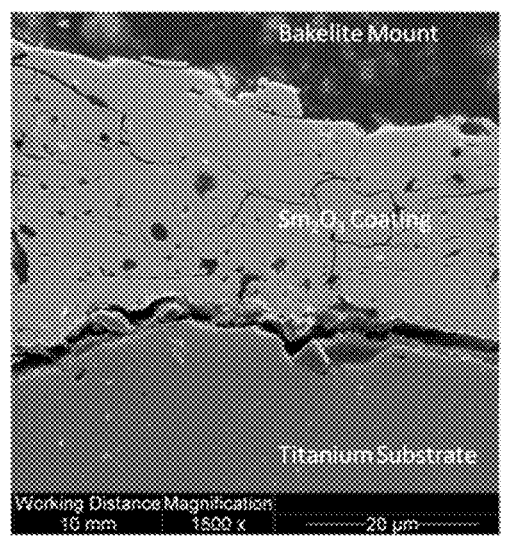
FIG. 5
FIG. 6
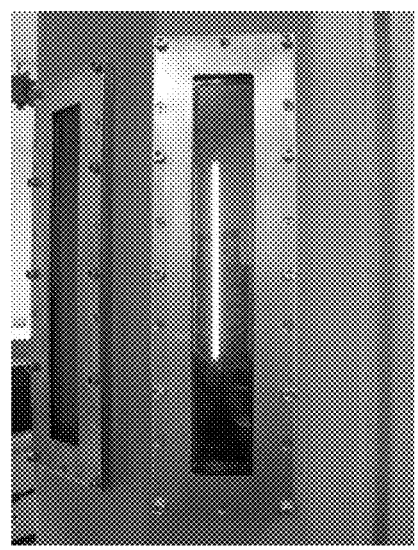

FIG. 9
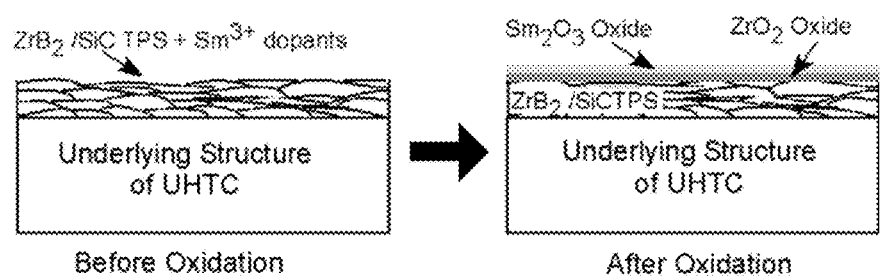
FIG 10A
FIG. 10B
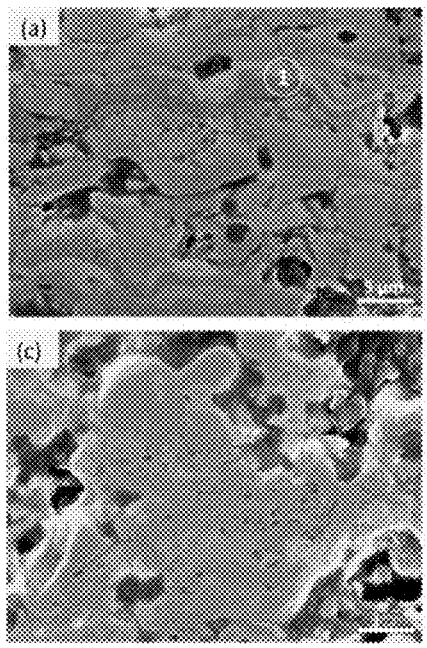
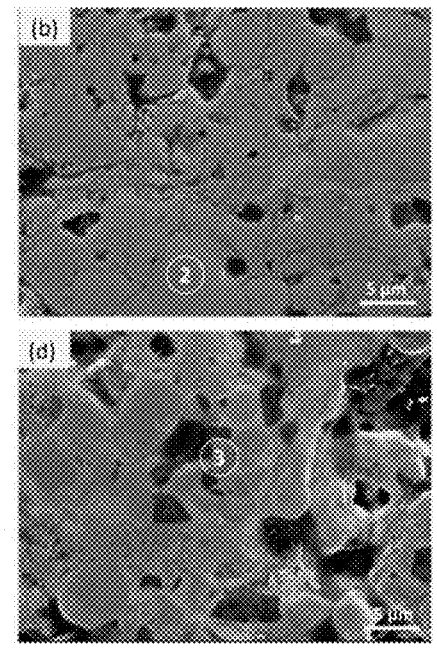
FIG. 10C
FIG. 10D

HIGH EMISSIVITY MATERIALS AND METHODS OF MANUFACTURE

CROSS-REFERENCE TO RELATED APPLICATIONS

This application claims priority to co-pending U.S. patent application Ser. No. 13/625,279, filed on Sep. 24, 2012, which claimed priority to then U.S. Provisional Patent Application Ser. No. 61/538,555, filed on Sep. 23, 2011.

GRANT STATEMENT

The invention was made with government support under FA9550-11-1-0079 awarded by the United States Air Force Office of Scientific Research. The government has certain rights in the invention.

TECHNICAL FIELD

The present invention relates to the field of ceramic science and, more particularly, high emissivity materials and coatings for bodies exposed to high-temperature environments.

BACKGROUND

Hypersonic vehicles frequently require sharp-featured nose tips and wing leading edges to reduce drag. However, the geometry of these edges increases the convective heat flow to the surface, ultimately increasing the overall temperature of the component with temperatures as high as 2300 K or more. Materials under consideration for hypersonic structures have often focused on ultra-high temperature ceramics (UHTCs) such as $ZrB_2$ and $HfB_2$, with SiC added for oxidation resistance. Such materials are typically hot pressed in order to achieve densities in excess of about 90 percent, making them expensive to produce and limiting their possible as-pressed shapes to simple geometries.

Embodiments of the present novel technology limit heating of hypersonic structures by radiating heat away with high emissivity structures and/or coatings. By reducing heat flow to these components, it may be possible to reduce oxidation rates and/or retain the mechanical performance necessary for the success of UHTC structures.

ZrB2-based UHTCs are examples of suitable high emissivity coatings that can radiate heat away from hypersonic leading edges and nose cones. Electronic and atomic processes are thought to lead to the high emissivity of these oxides, and additional materials may be identified by understanding these processes.

Materials characterization and total hemispherical emissivity testing may also be used to explain and potentially improve the performance and/or identification of the high emissivity materials.

Insight into the fundamental science governing favorable emission bands from rare-earth oxides may be attained using modeling to characterize the optical and IR properties of candidate materials via density functional theory (DFT) calculations. The use of atomistic predictive capabilities can guide the design of high $\epsilon$ coatings. Suspension plasma spray is a helpful processing approach for high $\epsilon$ coatings, affording a means to tailor the composition of the coatings. Rare-earth oxides that possess a high emissivity can be used as high $\epsilon$ surface in hypersonic environments to re-radiate the heat back to the environment, limiting the amount of heat absorbed by the underlying ceramic structure.

Hypersonic vehicles, including missiles and manned aircraft frequently use surfaces with sharp features. These surfaces include nose tips and wing leading edges, with the sharp geometry reducing the drag on the vehicle. However, the geometry of these edges increases the convective heat flow to the surface, ultimately increasing the overall temperature of the component with temperatures reaching as high as 2273 K in the stagnation region of a sharp leading edge. Prior attempts to mitigate the impact of these high temperatures have often focused on diboride ceramics, including $ZrB_2$ and $HfB_2$, with SiC added so that a silica scale is formed during service that provides protection from further oxidation. For example, by adding about 20 volume percent SiC to $ZrB_2$, silica will form on the surface after oxidation at about 1473 K. The silica scale remains protective for the underlying structure up to 1773 K before it begins to evaporate.

As the hypersonic environment may typically feature temperatures of about 500 degrees higher than the evaporation threshold temperature of silica, there remains a need for increasing the oxidation resistance of $ZrB_2$ and other high-temperature ceramic materials at extreme temperatures. The present novel technology addresses this need.

BRIEF DESCRIPTION OF DRAWINGS

FIG. 5 is a photomicrograph of a $Sm_2O_3$ coating on a $TiO_2$ substrate.

FIG. 6 illustrates a $Sm_2O_3$ coated $TiO_2$ rod emitting radiation at elevated temperatures.

FIG. 9 schematically illustrates the oxidation of Sm-doped $ZrB_2$ to yield a $ZrO_2/Sm_2O_3$ composite coating on a $ZrB_2$ substrate.

FIG. 10A is a photomicrograph of a $ZrB_2$—SiC composite material.

FIG. 10B is a photomicrograph of a 3 mole percent samaria doped $ZrB_2$—SiC composite material.

FIG. 10C is a photomicrograph of a 5 mole percent samaria doped $ZrB_2$—SiC composite material.

FIG. 10D is a photomicrograph of an 8 mole percent samaria doped $ZrB_2$—SiC composite material.

DETAILED DESCRIPTION OF INVENTION

Figure 1:
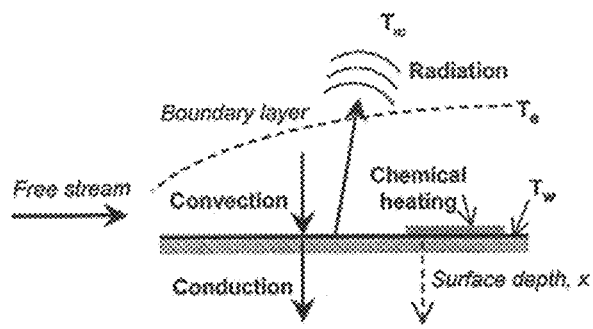
FIG. 1 is a schematic illustration of the forces experienced at the surface of a hypersonic structural component.

For the purposes of promoting an understanding of the principles of the novel technology, reference will now be made to the embodiments illustrated in the drawings and specific language will be used to describe the same. It will nevertheless be understood that no limitation of the scope of the novel technology is thereby intended, such alterations and further modifications in the illustrated device, and such further applications of the principles of the novel technology as illustrated therein being contemplated as would normally occur to one skilled in the art to which the novel technology relates.

Embodiments of the present invention address a more fundamental way to limit the flow of heat into hypersonic specific structures and decrease the structure's temperature during service. By reducing heat flow to these components (and therefore their temperatures), oxidation rates may be reduced and the mechanical performance desirable for the functionality of existing high-temperature structures may be extended. The stagnation wall temperature of a nose or leading edge is reduced as the emissivity ($\epsilon$) of the surface is increased, particularly for Mach numbers greater than 7. Emissivity may be optimized through careful design of a thermal protection system 10 (hereinafter "TPS"). TPS can be applied in the form of a coating 10 on the bulk materials of the nose cone and the leading edges to provide an extra barrier that impedes the heating and oxidation processes. In at least one embodiment, the TPS is in the form of an overlay coating 10 of high emissivity, and in certain embodiments the TPS 10 is able to withstand the extreme environments associated with re-entry.

Certain TPS coating 10 embodiments use rare-earth oxides, which generally have strong band emission with ranges from the visible to the near-infrared wavelength region, and these bands permit strong thermal excitation at temperatures compatible with the high-temperature stability of these materials.

In some embodiments, coatings 10 are formed on refractory substrates 15 via suspension plasma spray (SPS). In this process, stable ethanol-based suspensions with 1-5 volume percent powder loadings are made and then injected into a conventional plasma gun. As the ethanol evaporates, the powders melt and stack, forming a coating. SPS offers some easy advantages for coating fabrication that are useful to this program. For example, SPS can be used to spray sub-micron diameter powders, a beneficial characteristic as many of the coating powders are frequently not available in large enough sizes (i.e. greater than 10 μm) for plasma spray. As another example, the composition of the coating 10 can be adjusted by adding dopants 20 to the suspension. Thus, by simple modification of the suspension a coating 10 with a composition of 90 mol % $Sm_2O_3$/10 mol % T $m_2O_3$ can be made. SPS provides the ability to fabricate coatings 10 composed of two or more oxides.

According to hypersonic aerothermodynamic theory, bow shock forms in front of the leading edge. This forms a stagnation point just in front of the structure, which is subject to the most intense heating. The temperature on the leading edge surface is generally referred to as the wall temperature or Tw.

FIG. 1 illustrates the energy balance on the surface of a hypersonic structural component. There are two terms that act to heat the surface: (1) a convective heat flux due to the flow of high enthalpy gas over the surface and (2) a chemical heating that can occur due to the recombination of dissociated $O_2$ or $N_2$. There are two mechanisms by which heat can be removed from the surface. The first is by conduction through the ceramic structure, which is why a high thermal conductivity is an important property of many UHTC materials. For example, the $k_{th}$ of $ZrB_2$+20 vol. % SiC is approx 84 W/m/K. The second mechanism by which heat can be removed from the hypersonic structure is via radiation, as given by the following relationship:

$$\dot{q}_{rad} = \epsilon_r(T_w)\sigma[T_w^4 - T_\infty^4]$$

Where $\dot{q}_{rad}$ is the radiation heat flux away from the surface, $\epsilon_r(T_w)$ is the total hemispherical emissivity as a function of temperature at the wall temperature, $\sigma$ is the Stefan-Boltzmann constant, and $T_w$ and $T_\infty$ are the wall and environmental temperatures, respectively. Emissivity is the only material property in this equation, and from the energy balance, increasing $\epsilon_r$ will increase the heat flux away from the leading edge structure.

Figure 2:
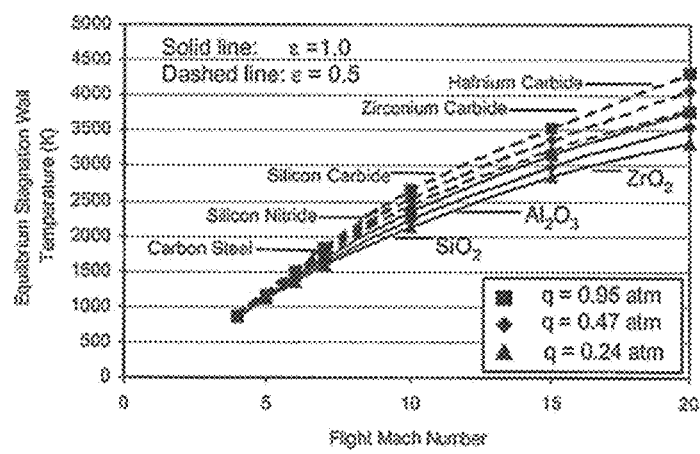
FIG. 2 graphically illustrates the relationship between temperature and speed (in Mach number) for various oxides.

By assuming negligible heat conduction into the material (therefore the only mechanism for removing heat is via radiation) an upper bound for $T_w$ can be calculated as a function of Mach number (see FIG. 2). The results of their calculations as a function of emissivity shown in the adjacent graph for a 2.54 cm radius nose. Common or candidate materials melting points are indicated on the plot, and q is the flight dynamic pressure. Most importantly, the stagnation wall temperature decreases as emissivity increases (solid lines on the plot). For example, at Mach 10, $T_w$ is reduced by about 400 K for a surface $\epsilon$ of 1 as compared to 0.5. Clearly, $\epsilon$ can make a significant difference in the heating and wall temperature of hypersonic structures.

Surfaces emit radiation in the form of electromagnetic waves. Cool bodies emit long wavelength radiation. As temperature increases, the rate of radiation increases in proportion to temperature to the fourth power and the emitted radiation wavelength decreases. At the temperatures of interest for hypersonic vehicles, the wavelength of the emitted radiation is a combination of near and far infrared (0.7-1000 μm) and visible (0.4-0.7 μm). Radiation is produced by the material, depending on the wavelength, via molecular vibrations and bound electron transitions.

The quantity characterizing the radiation-emitting properties of a surface is called the emissivity ($\epsilon$). The $\epsilon$ of a material is defined as the ratio of its ability to radiate energy to the ability of the perfect emitter (i.e., a blackbody) at the equivalent temperature. If a material can emit all the energy via radiation, it is deemed a blackbody with $\epsilon=1$. However, most materials will have an emissivity of less than 1. The emissivity of any material is a function of several parameters including the emission direction, temperature, and wavelength ($\lambda$). The normal spectral emissivity of a material, $\epsilon_n$, is measured for radiation emitted normal to a surface. The total hemispherical emissivity, $\epsilon_r$, is found by integrating over all angles of emission. As mentioned above, a high total hemispherical emissivity for our coatings to optimize heat transport via radiation from the surface of the hypersonic vehicle.

Some coating embodiments 10 may include a leading edge substrate 15 of $ZrB_2$ plus SiC additions, wherein emissivity values can range from 0.5 to 0.75 depending on the surface conditions. (Note that all $\epsilon$ values were determined at 1800° C. or 2073K). As shown in the table, however, there is a difference between un-oxidized and oxidized emissivity values. For example, without SiC additions, $ZrB_2$ first forms $B_2O_3$, which is evaporated near 1473 K. The sample is then left with a porous network of $ZrO_2$ with an $\epsilon$ of 0.57. The addition of SiC allows the $ZrB_2$ composite to form protective silica 10 with a higher emissivity, but silica begins to evaporate at 1773 K due to its high vapor pressure. In simulated re-entry conditions, a $ZrB_2$/SiC composite demonstrated an outer layer mainly composed of $ZrO_2$. Thus, the $\epsilon$ for oxidized $ZrB_2$–20 Vol. % SiC is actually time dependent, and would tend toward 0.57 as the protective silica 10 evaporates.

Figure 3:
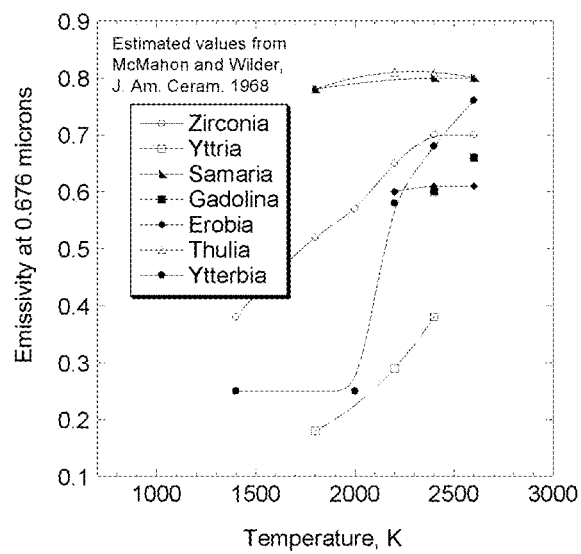
FIG. 3 graphically illustrates the relationship between emissivity and speed (in Mach number) for various oxides.

In FIG. 3, the emissivity of several rare-earth oxides are plotted as a function of temperature for an emission wavelength of 0.676 μm. Many of the oxides, such as $ZrO_2$ and $Y_2O_3$, have a low ε at low temperatures that rapidly rises with increasing test temperature. These oxides would not provide the extended "broadband" performance, i.e. high emissivity over a large temperature range, which is desired. For a wavelength of 0.676 μm, both $Sm_2O_3$ and $Tm_2O_3$ provide a high emissivity over an extended temperature range (1500 K through 2700 K), making them candidates of interest for the proposed work. Emissivity data measured at other wavelengths (not shown) and temperatures suggests $Yb_2O_3$ and $Gd_2O_3$ may also provide high emissivity over the temperatures of interest.

Figure 4:
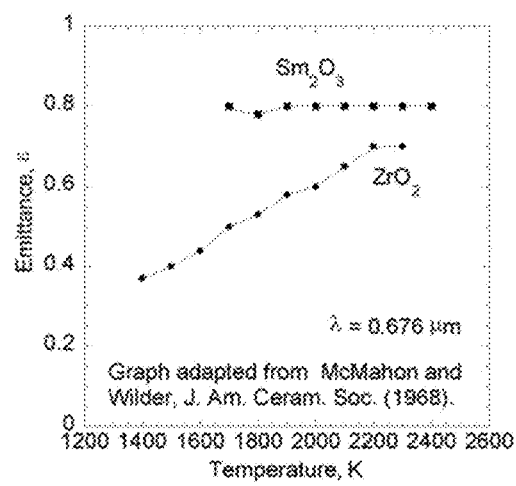
FIG. 4 graphically illustrates emittance as a function of temperature for select oxides.

FIG. 4 illustrates a comparison of embodiments utilizing $Sm_2O_3$ and $ZrO_2$. The final oxidation product in $ZrB_2$ above 1773 K is shown in the expanded adjacent plot as a function of temperature. Zirconia has an emissivity of 0.72 above 2250 K at a near-infrared wavelength of 0.676 μm. Below this temperature, ε rapidly decreases and is approximately 0.5 at 1700 K. Thus, while $ZrO_2$ effectively radiates heat away from the structure at 2250 K, it is not as effective in the range of 1600-2100 K. As shown in the same figure, at 1750 K, $Sm_2O_3$ demonstrates a wavelength-dependent ε of 0.8. This represents an oxide that is 60% better at radiating heat back to the environment than $ZrO_2$. $Sm_2O_3$ also has a higher emissivity than $ZrO_2$ at all temperatures of interest.

The physical properties of the various embodiment oxides are presented in the adjacent table. Zirconia is presented as the final or high-temperature oxide product of $ZrB_2$. All the coating 10 oxide compositions possess the necessary melting temperature for the application of interest. While the densities of all oxides listed are greater than zirconia, the actual volume of material used is quite low as the coatings 10 would be applied in thicknesses of about 100 to 200 μm on critical hypersonic structures in some embodiments. A total hemispherical emittance testing based on an embodiment with a plasma-sprayed $Sm_2O_3$ coating 10 applied to a 6 mm diameter titanium substrate was conducted (see FIG. 5). The coating 10 appeared white in the as-sprayed condition. The microstructure of the coating 10, shown in FIG. 5, was approximately 20-50 microns thick.

TABLE 1

| Oxide | $T_{melt}$ (K) | Density (g/cm³) |
| --- | --- | --- |
| $ZrO_2$ (baseline) | 2988 | 5.68 |
| $Sm_2O_3$ | 2608 | 8.35 |
| $Tm_2O_3$ | 2614 | 8.60 |
| $Yb_2O_3$ | 2628 | 9.17 |
| $Gd_2O_3$ | 2693 | 7.07 |

Figure 7:
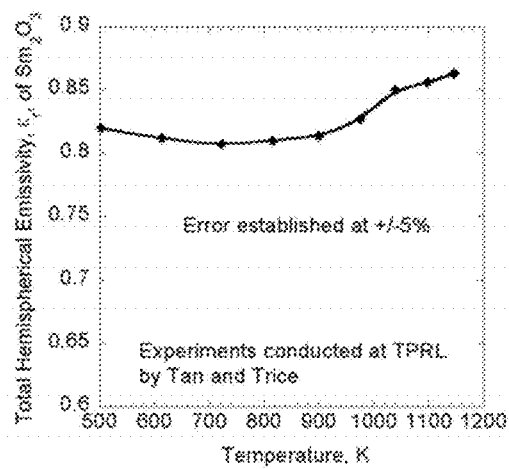
FIG. 7 graphically illustrates total hemispherical emissivity as a function of temperature for a $Sm_2O_3$.

As shown in FIG. 6, the sample was mounted between two electrodes, contained in a vacuum maintained at less than $8 \times 10^{-6}$ torr, and heated by passing DC current through it. The power generated in the central region of the specimen is equal to the radiative heat transfer to the surroundings, and $\epsilon_r$ was determined as a function of temperature. The long cylindrical specimen, as it was being tested, is shown in the adjacent photograph. The emissivity results are shown in FIG. 7.

Density functional theory (DFT) calculations provide a first principles description of materials in terms of basic physics and fundamental physical constants. DFT calculations give the total energy of a collection of atoms and information about its electronic structure. Atomic forces, obtained from the total energy using a theorem due to Feynman and Hellman, are used to simulate the temporal evolution of the system via molecular dynamics. Thus, DFT provides a first principles description of the temperature-dependent atomic vibrations and electronic structure of materials from which IR and optical properties can be extracted. DFT provides an accurate description of materials not only at ambient conditions but also under extreme conditions of pressure and temperate as well as in cases where experimental data are entirely unavailable. For example, DFT has been used to characterize solid-solid transformations in MgO under extreme pressures and to explore the atomic and electronic structure of nanometer diameter 1D silicon nanostructures not yet synthesized and the formation of defects in amorphous $SiO_2$.

There are several approaches for obtaining optical properties from DFT calculations. Within the single particle approximation of DFT, the imaginary part of the frequency dependent dielectric constant can be obtained using Fermi's golden rule:

$$\varepsilon''(\omega) = \frac{4\pi^2}{\Omega \omega^2} \sum_{i \in VB} \sum_{j \in CB} \sum_k w_k |p_{ij}|^2 \delta(\varepsilon_{kj} - \varepsilon_{ki} - \omega)$$

where $\Omega$ is the cell volume, CB and VB denote conduction and valence bands, $w_k$ is the weight of reciprocal point k, $\epsilon_{ki}$ are eigenenergies and $p_{ij}$ is the transition matrix element: $<\Psi_j|p|\Psi_i>$. Other optical properties can be calculated from the frequency dependent ε"; for example, the real part of the dielectric constant is obtained from the Kramers-Kronig relation. DFT is a ground state single particle theory and can have shortcomings in predictions of excited states which can affect the accuracy of the calculation of optical properties within the single particle approximation. Thus, a GW quasiparticle approach based on many-body perturbation theory may also be used to compute optical properties. This approach can lead to an accurate prediction of optical properties in $TiO_2$ and similar accuracy with the oxides of various embodiments of the present invention.

Figure 8:
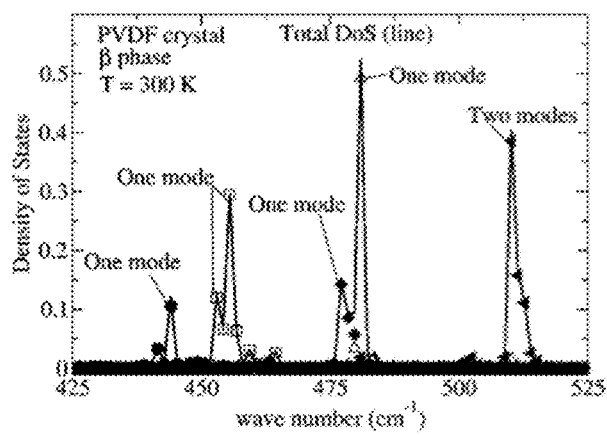
FIG. 8 graphically illustrates the density of states as a function of wave number.
Figure 11:
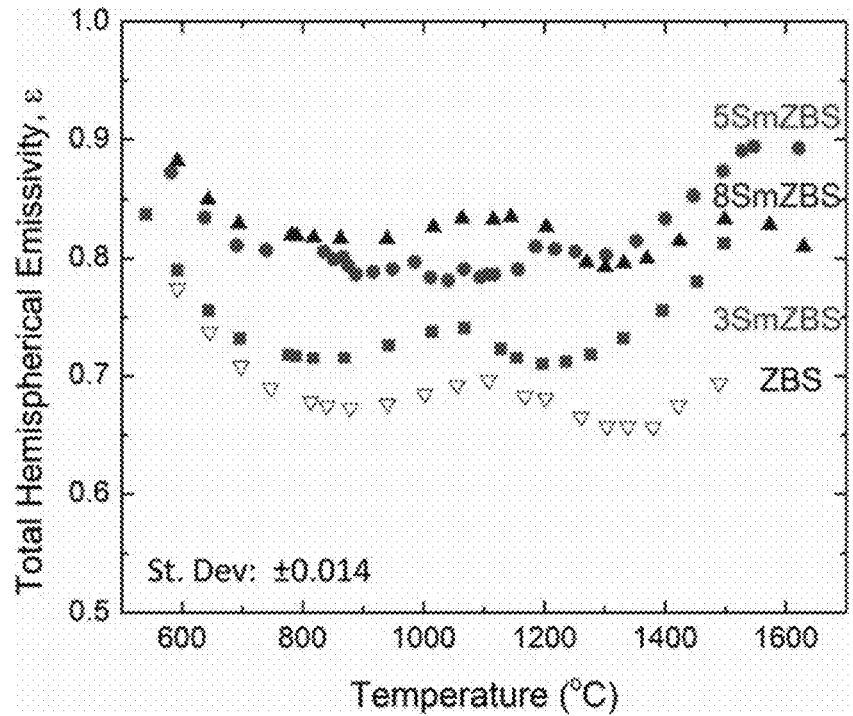
FIG. 11 is plot of total hemispherical emissivity as a function of temperature for the materials of FIGS. 10A-10D.
Figure 12:
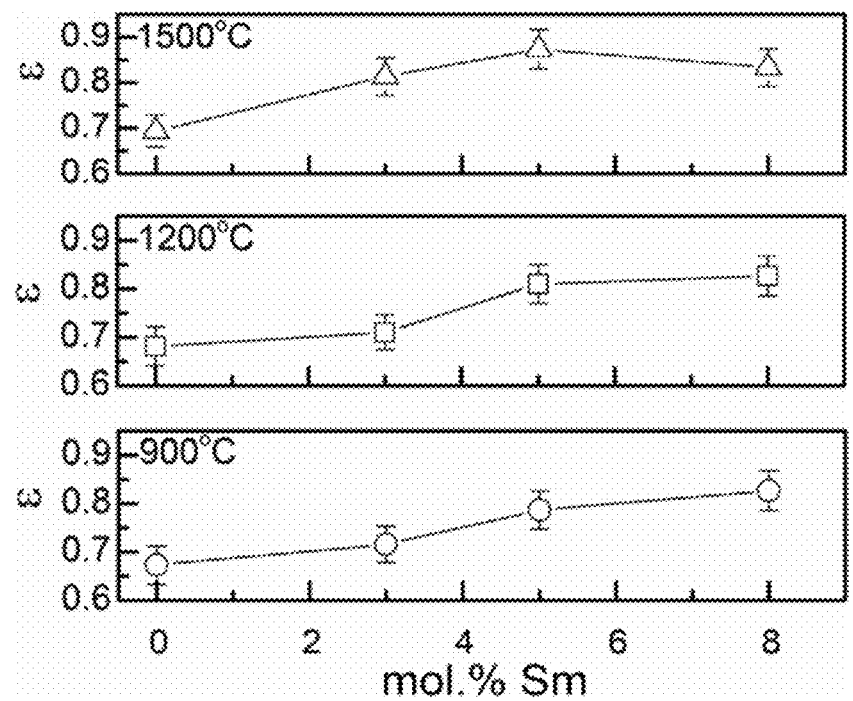
FIG. 12 is a plot of total hemispherical emissivity as a function of samarium concentration in $ZrB_2$/SiC as-sprayed coatings at 900, 1200, and 1500 degrees Celsius.
Figure 13:
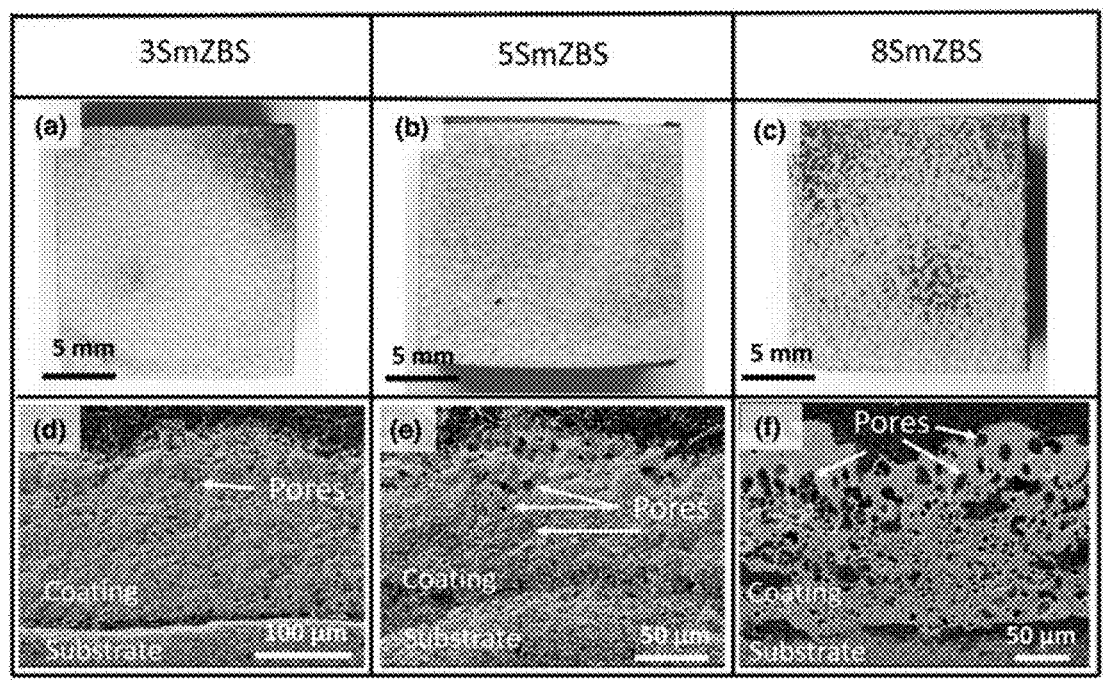
FIG. 13 illustrates the surface and cross-sectional effects of ablation testing on 3, 5, and 8 mole percent samaria doped $ZrB_2$/SiC.

IR properties are associated with changes in the dipole moments in a material due to thermal vibrations of ions. These properties will be computed using DFT from Born effective charges (that relate changes in polarization to atomic displacements) and the dynamical matrix that describes phonons. This is a standard approach but is based on the harmonic approximation and is more accurate at low temperatures. Thus, we will also study vibrations from finite temperature molecular dynamics where anharmonic effects are explicitly described. At least one method enables the calculation of normal modes directly from MD trajectories which is required to compute IR properties. We have shown that finite temperature normal modes can be obtained by diagonalizing the matrix of atomic velocity covariances:

$$K_{ij} = \frac{1}{2} \langle \sqrt{m_i m_j} u_i u_j \rangle_t$$

where $m_i$ and $u_i$ are the atomic mass and velocity of atom i and $\langle \rangle_t$ denotes time average. The solid line on FIG. 8 shows the total finite temperature vibrational density of states (DOS) for PVDF, a crystalline polymer. The symbols on the figure represent the contribution of the anharmonic modes to the DOS; every feature of the DOS can be attributed to one or few anharmonic normal modes.

As can be seen from the above discussion, DFT calculations can be used to characterize the optical and IR properties of promising oxides. The calculations will not only provide valuable guidelines to the experimental efforts but also will provide a fundamental understanding of the atomic and electronic processes responsible for the desirable emissivity of the oxides. As described earlier the measured emittance depends not only on the material's emissivity but also on the surface roughness. Theoretical calculations may ignore this last effect but are expected to nevertheless provide insight and guidelines across different materials.

By analyzing the fundamental mechanisms governing emissivity in the various embodiments, rare-earth oxides of interest at temperatures of about 1500 through about 2000 K and the compositions which are best for achieving high emissivity may be identified.

The optical properties of various embodiments, such as $Sm_2O_3$, $Tm_2O_3$, $Yb_2O_3$, and $Gd_2O_3$, can be estimated. In one example, the total energy may be minimized with respect to atomic and cell parameters to obtain the relaxed structure of the various oxides using DFT, which may be compared with experimental structure data for a more complex analysis. Two approximations may be used:

Single particle approach using Kohn-Sham eigenvalues and eigenfunctions

Quasi-particle GW approach

While the GW approach provides a more accurate description, it also is computationally more intensive and consequently restricted to relatively small systems.

Defects, including free surfaces and grain boundaries, are likely to have a large effect in the optical and IR properties of the coatings. We will construct atomistic models containing free surfaces and grain boundaries and use DFT to characterize their structure, optical and IR properties. We envision that the change in bonding and local atomic structure at the defects will have an important effect in the local ionic vibrations and electronic structure near the defects and consequently the emissivity of the coatings. These calculations are particularly important since the plasma spray process is known to result in significant porosity.

The rare-earth oxides of some embodiments include $Sm_2O_3$, $Tm_2O_3$, $Yb_2O_3$, and $Gd_2O_3$. Note that $ZrO_2$ may also be a baseline oxide product of $ZrB_2$.

Some embodiments use plasma spray as the preferred coating method, with one modification to the process used to inject powders into the plasma. Rather than use air to feed the powders, we will inject a liquid containing the powders into the plasma. This modified powder injection approach is deemed Suspension Plasma Spray (SPS). SPS is necessary because the powders available for purchase for the proposed work are all less than 10 μm in diameter, making it difficult to feed them into the plume using air due to electrostatic interactions. SPS first involves dispersing sub-micron-sized powders in a solvent to form a colloidal suspension; the dispersion of the particles in the suspension prevents agglomeration. The suspension is fed into the plasma through a small orifice where the solvent, generally ethanol, is evaporated and the powder is melted. The forward motion of the powders in the plume causes them to strike the substrate and flatten, forming lamellae which quickly cool. Coatings are fabricated by rastering the plasma gun over the surface to be coated.

Emissivity testing requires that coatings be directly applied to a conductive substrate. In some experiments, $Sm_2O_3$ was sprayed onto titanium tubes. However, during testing in a vacuum, Ti formed $TiO_2$ by capturing the oxygen in the $Sm_2O_3$, beginning at approximately 1200 K reducing $Sm_2O_3$ to Sm. The direct plasma spraying the rare-earth oxides onto either W or Mo substrates tends to avoid the oxidation problem encountered using Ti substrates. Both W and Mo have $\epsilon_r$ in the range of 0.25-0.30 for temperatures of interest. Quarter-inch outer diameter/500 mm long tubes of Mo are readily available. The 500 mm long tube can be cut into two substrates for total hemispherical emissivity testing.

Each doped coating will be the Total Hemispherical Emittance (THE) measurement using the calorimetric method (ASTM 835-06). The calorimetric method is preferable over the optical method because the former is able to heat the sample up to more representative use temperatures.

The phase stability of the plasma-sprayed rare-earth oxide coatings is a useful parameter to evaluate. Furnaces capable of heating coatings to nearly 2000 K and the necessary x-ray diffraction equipment to determine the phase assemblage and changes, if any, after time (1, 10, 100 hr) at elevated temperatures is likewise useful to these evaluations. The microstructure of the coatings in the as-sprayed and after heat-treatment conditions may be evaluated using scanning electron microscopy (SEM) to study the topography of the coatings as well as the cross sections.

Porosity of approximately (10-20 vol. %) is frequently present in coatings prepared by plasma spray. Evaluation of the effect of porosity on emissivity may be conducted by measuring density using Archimedes' principle and the connection between coating porosity and $\epsilon_r$, if any, may be determined. Finally, because of the importance of the surface roughness of leading edges in determining laminar or turbulent flow and emissivity, the measurement this quantity as a function of coating parameters using atomic force microscopy can provide valuable insight into a coating's effectiveness.

Coating chemistry and/or compositional effects may also effect emissivity. Mixed oxides might lead to improved emissivity by complementing each other's spectral lines and vibrational spectra. Alternate embodiments including coatings with multiple rare-earth oxides.

SPS may be used to produce compositionally-variant coatings, using one of two approaches depending, at least in part, on the relative volume fractions of each rare-earth oxide composition in the coating. One approach produces coatings with concentrations of less than 15 mol. % of the secondary rare-earth oxide. Another approach produces coatings with more than 15 mol. % of the secondary rare-earth oxide.

It is possible to change the composition of a coating by adding the desired dopant to the suspension containing the majority-phase powder. It was discovered that during the short time in plasma the dopant would diffuse into the powder, effectively alloying it at the atomic level. As such, the mixing of $Nd^{3+}$ and $Yb^{3+}$ dopant ions into the $ZrO_2$ lattice may occur during plasma spraying. In this example, the dopant was not added as an oxide, but rather as an ethanol-soluble rare-earth nitrate into a suspension containing the majority-phase submicron-sized powders. For example, if the goal were to fabricate a coating composed of 90 mol. % $Sm_2O_3$ and 10 mol. % $Tm_2O_3$, we would first ball mill/mix a suspension of submicron-sized $Sm_2O_3$ powders. To this mixture we would add $Tm(NO_3)_3$-$6H_2O$. During plasma spray, the Tm would be oxidized and incorporated into the coating, either as a secondary phase or via solid solution in the $Sm_2O_3$. This approach has the advantage of atomically mixing the dopant rare-earth into the coating and may afford improved emissivity as described above.

For larger concentrations of secondary phase, we would simply mix together two (or more) rare-earth powder types in the same suspension, followed by spraying it. For example, to fabricate a coating of 50 mol. % each of $Sm_2O_3$ and $Tm_2O_3$, equal molar amounts of both rare-earth oxide powders would be added to the suspensions. The final coating would have microstructural features of both oxides.

These multi-composition coatings may be sprayed on Mo or W substrates, and the $\epsilon_r$ evaluated as hereinabove. The microstructure, long term stability at elevated temperature, and physical properties will all be investigated and correlated with $\epsilon_r$ using X-ray diffraction, SEM, and energy dispersive spectroscopy techniques to evaluate dopant distribution.

High emissivity coatings have been proposed that would ultimately be sprayed directly on a UHTC. However, alternate embodiments include an approach in which the high $\epsilon$ rare-earth oxide would form in-situ as a result of the simulated service conditions (high temperature oxidation) of a $ZrB_2$/SiC thermal protection system (TPS).

An example of a TPS incorporating this design concept is shown in the FIG. 9 "before oxidation" and "after oxidation" schematics. In this approach, a $ZrB_2$/SiC TPS doped with a rare-earth element is plasma-sprayed to the UHTC structure 15. The UHTC substrate 15 may be a portion of a hypersonic vehicle, for example. The UHTC may have like or similar composition to the TPS material, were it undoped. It is possible to plasma spray $ZrB_2$ and SiC by blending powders of each prior to spraying. The rare-earth that is added (shown in the schematic for convenience as $Sm^{3+}$, although any convenient rare-earth element, or mixtures thereof, may be used) is designed to oxidize during service and create the necessary high $\epsilon$ layer 10. This is schematically illustrated in the "after oxidation" image, with $Sm_2O_3$ being the desired oxidation product. Likewise, the oxide layer 10 may include cation oxides of the refractory material, such as $ZrO_2$, $HfO_2$, and mixtures thereof. In some embodiments, the cation oxides of the refractory material may be present as a separate, distinct layer 25.

A rare-earth dopant may be added using the approach described above where ethanol-soluble nitrates are added directly to the suspension. Thus, instead of spraying a suspension of only $ZrB_2$ and SiC powders, one can spray suspensions of $ZrB_2$ and SiC powders, with an added dopant such as $Sm(NO_3)_3$-$6H_2O$, $Tm(NO_3)_3$-$6H_2O$, or the like. Each of these compounds is soluble in ethanol. The amount of dopant added is typically optimized to form the desired high emissivity oxide.

The $ZrB_2$/SiC TPS is generally considered to form porous $ZrO_2$ after oxidation above 1773 K; the $Sm^{3+}$ doped TPS composition likewise forms a thin layer of $Sm_2O_3$ over the $ZrB_2$ and/or $ZrB_2$/$ZrO_2$ composite substrate after oxidation above the same temperature.

It should be noted that a pure rare-earth oxide layer is not necessarily required to provide high $\epsilon$; rather, embodiments with a mixture of rare-earth in the silica (from oxidation of the SiC) can provide sufficient emissivity performance.

In another embodiment, $ZrB_2$ or $ZrB_2$/SiC (ZBS) composite material is doped with samarium, typically as $Sm_2O_3$, in amounts between about 1 and about 10 mole percent, more typically between 3 and 8 mole percent, and still more typically at about 5 mole percent, to yield a samarium-doped $ZrB_2$ material. The samarium-doped $ZrB_2$ material exhibits increased emissivity, especially at elevated temperatures, as well as increased toughness and ablation resistance. Samarium-dopant concentration and as-sprayed coating properties.

TABLE 2

| | $Sm(NO_3)_3$ (mol %) | Actual Sm Incorporated (mol %) | Bulk Density (g/cm³) | Total Porosity (%) | Surface Roughness (μm) |
|---|---|---|---|---|---|
| ZBS | 0 | 0 | 4.5 | 18.2 | 3.47 |
| 3SmZBS | 5 | 2.8 | 4.1 | 26.1 | 8.58 |
| 5SmZBS | 10 | 5.3 | 3.7 | 32.0 | 16.07 |
| 8SmZBS | 15 | 8.2 | 3.5 | 35.7 | 21.10 |

All coatings nominally contained $ZrB_2$ –20% vol % SiC. The porosity calculation is based on final coating composition.

Crystalline phases present in the as-sprayed and post ablation coatings identified via microscopy and XRD.

TABLE 3

| | As-sprayed | Post-Ablation |
|---|---|---|
| 3SmZBS | $ZrB_2$, SiC | $Sm_{0.2}Zr_{0.8}O_{1.9}$, m-$ZrO_2$ |
| 5SmZBS | $ZrB_2$, SiC | $Sm_{0.2}Zr_{0.8}O_{1.9}$, $Sm_2Zr_2O_7$, m-$ZrO_2$ |
| 8SmZBS | $ZrB_2$, SiC | $Sm_2Zr_2O_7$, $Sm_{0.2}Zr_{0.8}O_{1.9}$, m-$ZrO_2$ |

Maximum surface temperature and mass change (Δm/m) of the samarium-modified ZrB/SiC coatings during ablation testing.

TABLE 4

| Dopant Concentration (mol %) | Maximum Temperature (° C.) | Δm/m |
|---|---|---|
| 3 | 1727 ± 73 | 0.19 ± 0.01 |
| 5 | 1631 ± 73 | 0.21 ± 0.01 |
| 8 | 1661 ± 73 | 0.26 ± 0.01 |

As seen in tables 2 and 3, the total hemispherical emissivity of ZBS increases with samarium doping levels. At 5 mole percent samarium, the Sm-doped ZBS composition has an emissivity of 0.87 at 1500 degrees Celsius, and an emissivity of 0.9 at 1600 degrees Celsius. Doping ZBS with 8 mole percent Sm yields an emissivity of 0.83 at 1500 degrees Celsius.

The major phase present in 3 and 5 percent Sm-doped ZBS was found to be $Sm_{0.2}Zr_{0.8}O_{1.9}$, with some $Sm_2Zr_2O_7$ detectable in the 5 percent doped material. The major phase in 8 percent doped ZBS was found to be $Sm_2Zr_2O_7$ with some $Sm_{0.2}Zr_{0.8}O_{1.9}$ present as well.

The Sm-dopant was incorporated into spray-dried $ZrB_2$/SiC powder precursor via a chemical doping technique and coatings were prepared by shrouded plasma spray. Of course, Sm and/or $Sm_2O_3$ may be incorporated into $ZrB_2$ and/or $ZrB_2$/SiC by any convenient doping technique.

In operation, the hypersonic refractory material may be used to provide an ablation resistant, high emissivity coating for a refractory leading edge portion for a hypersonic vehicle. The high emissivity coating may be adhered to the refractory leading edge portion. Typically, the coating high emissivity coating would be $ZrB_2$ or ZBS doped with a dopant material selected from the group including Sm (typically as $Sm_2O_3$ or $Sm(NO_3)_3$), Tm (typically as $Tm(NO_3)_3$ or $Tm_2O_3$), and mixtures thereof. The dopant material is typically present in a concentration of between 3 mole percent and 8 mole percent.

In other embodiments, the Sm dopant may be completely or partially replaced with Tm.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:

1. A refractory material, comprising:
a $ZrB_2$/SiC matrix material; and
a first cation dopant material present in amounts between about 1 mole percent and about 10 mole percent and homogeneously distributed in the $ZrB_2$/SiC matrix material;
wherein the first cation dopant material is $Sm_2O_3$.

2. The refractory material of claim 1, wherein at 1500 degrees Celsius, the refractory material has an emissivity of at least 0.83.

3. The refractory material of claim 1, wherein at 1500 degrees Celsius, the refractory material has an emissivity of at least 0.87.

4. The refractory material of claim 1, wherein at 1600 degrees Celsius, the refractory material has an emissivity of at least 0.90.

5. The refractory material of claim 1 wherein the first cation dopant is $Sm_2O_3$ present in a concentration of 5 mole percent.

6. The refractory material of claim 1 wherein the ratio of $ZrB_2$ to SiC is about 4:1.

7. The refractory material of claim 1 wherein the first cation dopant is $Sm_2O_3$ present in a concentration of 8 mole percent, and wherein the refractory material exhibits an emissivity of 0.83 at 1500 degrees Celsius.

* * * * *